United States Patent [19]

Ito et al.

[11] Patent Number: 6,042,728
[45] Date of Patent: Mar. 28, 2000

[54] WATER PURIFIER AND METHOD OF WATER PURIFICATION

[75] Inventors: Eizo Ito; Naoki Ito, both of Tokyo, Japan

[73] Assignee: Tokyo Biox Corporation, Tokyo, Japan

[21] Appl. No.: 09/365,767

[22] Filed: Aug. 3, 1999

[30] Foreign Application Priority Data

Aug. 6, 1998 [JP] Japan .................................. 10-234983

[51] Int. Cl.[7] .............................. C02F 3/34; C12N 11/00
[52] U.S. Cl. ........................ 210/611; 210/617; 210/150; 435/174; 435/299.1
[58] Field of Search ..................................... 210/610, 611, 210/615–617, 150, 151; 435/174–182, 262.5, 264, 299.1, 822, 856, 923

[56] References Cited

U.S. PATENT DOCUMENTS

| | | | |
|---|---|---|---|
| 3,979,283 | 9/1976 | Prudom | 210/611 |
| 4,081,367 | 3/1978 | Hulls et al. | 210/610 |
| 4,371,440 | 2/1983 | Yoshizawa et al. | 210/611 |
| 4,816,158 | 3/1989 | Shimura et al. | 210/611 |
| 5,334,312 | 8/1994 | Lajoie | 210/610 |
| 5,454,948 | 10/1995 | Tyagi et al. | 210/611 |
| 5,510,112 | 4/1996 | Gatt et al. | 210/610 |
| 5,716,523 | 2/1998 | Powlen | 210/611 |

*Primary Examiner*—Thomas G. Wyse
*Attorney, Agent, or Firm*—Sughrue, Mion, Zinn, Macpeak & Seas, PLLC

[57] ABSTRACT

An effective water purifier containing microorganisms other than Bacillus strains and a method of water purification, the water purifier containing *Lactobacillus paracasei* subspecies *paracasei, Enterococcus malodoratus* and *Candida lipolytica.*

17 Claims, No Drawings

WATER PURIFIER AND METHOD OF WATER PURIFICATION

The present invention relates to a water purifier and a method of water purification, more specifically to a water purifier using microorganisms and a method of water purification.

As microorganisms for purifying water, effluent in particular, microorganisms of various *Bacillus genera* are known. It is an object of the present invention to provide an effective water purifier using microorganisms other than *Bacillus genera* and a method of water purification using the same.

The present inventors have diligently searched for microorganisms capable of achieving the above object, and have found that a combination of *Lactobacillus paracasei* subspecies *paracasei*, *Enterococcus malodoratus* and *Candida lipolytica* can effectively and efficiently purify water.

The present invention has been completed on the basis of the above finding, and the water purifier of the present invention contains *Lactobacillus paracasei* subspecies *paracasei*, *Enterococcus malodoratus* and *Candida lipolytica*.

Further, the method of water purification, provided by the present invention, comprises allowing *Lactobacillus paracasei* subspecies *paracasei*, *Enterococcus malodoratus* and *Candida lipolytica* to be concurrently present in water to purify the water.

In the present invention, water can be efficiently purified by the interaction of the above microorganisms and yeast other than *Bacillus genera* and the interaction among the above microorganisms and yeast and microorganisms existing in nature.

The specific constitution of the present invention will be explained in detail hereinafter.

The water purifier of the present invention contains *Lactobacillus paracasei* subspecies *paracasei*, *Enterococcus malodoratus* and *Candida lipolytica*.

Lactobacillus is Gram-positive bacillus which ferments saccharose to generate lactic acid mainly. There are known examples of *Lactobacillus paracasei* subspecies *paracasei*, which are isolated from dairy products, sewer, silage and clinical materials.

As *Lactobacillus paracasei* subspecies *paracasei*, it is preferred to use *Lactobacillus paracasei* subspecies *paracasei* which the present Applicant has internationally deposited in Agency of Industrial Science and Technology, National Institute of Bioscience and Human Technology, Patent Microorganism Depository as DDD-a (Accession No. FERM BP-6463) under Budapest Treaty on international accession of deposition of microorganisms under patent procedures (international deposition will be used in this sense hereinafter).

The bacteriological properties of the above *Lactobacillus paracasei* subspecies *paracasei* will be explained below.

| Items tested | Test results |
|---|---|
| Morphology | vacillus |
| Gram stainability | + |
| Spore | − |
| Mobility | − |
| Behavior to oxygen | fucultative anaerobic |
| Catalase | − |
| Formed lactic acid | L(+) |
| Gas generation from glucose | − |
| Gas generation from glucoate | + |
| Growing at 15° C. | + |
| Growing at 45° C. | − |
| Capability of fermentation of saccharose | |
| Amygdalin | + |
| Arabinose | − |
| Aesculin | + |
| Fructose | + |
| Galactose | + |
| Glucose | + |
| Gluconate | + |
| Lactose | + |
| Maltose | + |
| Mannitol | + |
| Mannose | + |
| Melezitose | + |
| Melibiose | − |
| Raffinose | − |
| Rhamnose | − |
| Ribose | + |
| Salicin | + |
| Sorbitol | + |
| Sucrose | + |
| Trehalose | + |
| Xylose | − |
| GC content (mol %) of DNA in microorganism*1 | 46 |

*1 According to HPLC method

Enterococcus is known as enteric coccus, and an example isolated from cheese is known as *Enterococcus malodoratus*.

As *Enterococcus malodoratus*, it is preferred to use *Enterococcus malodoratus* which the present Applicant has internationally deposited in Agency of Industrial Science and Technology, National Institute of Bioscience and Human Technology, Patent Microorganism Depository as DDD-b (Accession No. FERM BP-6464).

The bacteriological properties of the above *Enterococcus malodoratus* will be explained below.

| Items tested | Test results |
|---|---|
| Morphology | streptococcus |
| Gram stainability | + |
| Spore | − |
| Mobility | − |
| Behavior to oxygen | Fucultative anaerobic |
| Catalase | − |
| Gas generation from glucose | − |
| Formed lactic acid | L(+) |
| Growing at 15° C. | + |
| Growing at 45° C. | − |
| Growing in the presence of 6.5% NaCl | + |
| Growing at pH 9.6 | + |
| Growing in the presence of 40% bile | + |
| Hemolysis | α-hemolysis |
| Arginine dihydrolase | − |
| Hippuric acid | − |
| Hydrolsys of aesculin | + |
| Growing in 0.1% methylene blue milk | − |
| VP reaction | − |
| Formation of acids | |
| Xylose | − |

-continued

| Items tested | Test results |
|---|---|
| Rhamnose | + |
| Sucrose | + |
| Lactose | + |
| Melibiose | + |
| Raffinose | + |
| Melezitose | +*1 |
| Glycerol | − |
| Adonitol | −*2 |
| Sorbitol | + |
| Mannitol | + |
| L-Arabinose | − |
| Generation of yellow dyestuff | − |
| GC content (mol %) of DNA in microorganism*2 | 40 |

*1 Atypical property
*2 According to HPLC method

The genus Candida is yeast coming under incomplete fungi, and *Candida lipolytica* has lipase and is therefore isolated as a microorganism which causes the deterioration of butter, margarine and the like. Examples isolated from olive, soil and animals including human being have been found.

As *Candida lipolytica*, it is preferred to use *Candida lipolytica* which the present Applicant has internationally deposited in Agency of Industrial Science and Technology, National Institute of Bioscience and Human Technology, Patent Microorganism Depository as DDD-c (Accession No. FERM BP-6465).

The bacteriological properties of the above DDD-C, *Candida lipolytica*, will be explained below.

| Items tested | Test results |
|---|---|
| Morphology of trophocyte | oval~elliptical~cylindrical |
| Morphology of growth | multipolar budding |
| Liquid culture | Precipitation and formation of a skim observed (25° C., 3 days). |
| Pseudomycellium | formed (25° C., 3 days) |
| Fungus | formed (25° C., 3 days) |
| Ascospore | Formation not observed in any of ADAMS, GORODKOWA, malt, YM, V-8 and potato dextrose media. | any of ADAMS, GORODKOWA, malt, YM, V-8 and potato dextrose media.

| Capability of fermentation | |
|---|---|
| Glucose | − |
| Galactose | − |
| Sucrose | − |
| Maltose | − |
| Lactose | − |
| Raffinose | − |
| Capability of Assimilation | |
| Galactose | − |
| Sucrose | − |
| Maltose | − |
| Cellobiose | − |
| Trehalose | − |
| Lactose | − |
| Melibiose | − |
| Raffinose | − |

-continued

| Melezitose | − |
|---|---|
| Starch | − |
| D-Xylose | − |
| L-Arabinose | − |
| D-Ribose | + |
| L-Rhamnose | − |
| Glycerol | + |
| Etythritol | + |
| Ribitol | − |
| D-Mannitol | + |
| Lactate | + |
| Succinate | + |
| Citrate | + |
| Inositol | − |
| Capability of Assimilation of nitrate | − |
| Growth at 37° C. | − |
| Growth in vitamin-deficient medium | − |
| Decomposition of urea | slightly |
| Color of DBB | − |
| Lipase | + |

The above three strains of the microorganisms are well grown in any medium if the medium is a general nutrient medium. *Lactobacillus paracasei* subspecies *paracasei* and *Enterococcus malodoratus* are particularly preferably grown in an MRS medium, and *Candida lipolytica* is particularly preferably grown in a YM medium.

Any of the above strains of microorganisms well grow when cultured approximately at 15 to 45° C.

In the water purifier of the present invention, the above three strains of the microorganisms are preferably reserved in a state where a group of the microorganisms are fixed on a carrier so that they are easy to handle.

The amount ratio of the three strains of the above microorganisms contained in a group of the microorganisms fixed on a carrier is not specially limited. That is, when the above strains of the microorganisms are allowed to be co-present in water, they are stabilized in a nearly constant amount ratio depending upon preservation or culture conditions. However, when the preservation or culture conditions are properly set so as to attain the following amount ratio, the function of water purification can be remarkably efficiently exhibited.

*Lactobacillus paracasei* subspecies *paracasei*:

| *Lactobacillus paracasei* subspecies *paracasei*: | 20 to 60% |
|---|---|
| *Enterococcus malodoratus*: | 20 to 60% |
| *Candida lipolytica*: | 10 to 30% |

The carrier for fixing a group of the microorganisms preferably has a large capacity for holding the microorganisms and enables the easy activation of the microorganisms.

The carrier is preferably selected from stones and rocks (e.g., perlite and diatomite) or a pulverized product thereof, gravel, sand, plastic, ceramic (e.g., alumina, silica, natural zeolite and synthetic zeolite), and talc. It is particularly preferred to use a porous material having continuous pores such as porous ceramic or porous plastic. For example, it is preferred to use a fine powder (trade name: Perlite) obtained by heat-treating a pulverized product of perlite at a high temperature under high pressure and sharply reducing the pressure to convert it to a porous material, since it has the property of allowing microorganisms to adhere thereto and keep them alive. The above porous material preferably has a pore diameter of approximately 2 to 10 μm. The form of the above carrier may be any one of a mass, particles, a powder, a fine powder, a plate and an acicular material, while the carrier is preferably a powder having an average particle diameter of 2 mm or less, particularly preferably a powder having an average particle diameter of approximately 50 μm to 1 mm. A group of the microorganisms fixed to the above carrier may be used in a state where it is contained in a container well permeable to water or gas such as a container made of cloth or a net.

Further, a woven fabric or non-woven fabric in the form of a ribbon or a sheet may be used as the above carrier.

When the carrier is allowed to support a group of the microorganisms, the carrier and a dispersion of the microorganisms of the present invention may be mixed and then the mixture may be dried, while a group of the microorganisms may be cultured directly on the carrier.

Although differing depending upon supporting conditions, the amount of a group of the supported microorganisms is preferably 5 to 20,000,000,000 microorganisms/cm³, more preferably 10 to 10,000,000,000 microorganisms/cm³.

The above three strains of the microorganisms can effectively decompose organic substances in an effluent by interactions.

Further, the safety of each of the three strains of the microorganisms has been confirmed by the oral administration thereof to mice.

In the method of water purification, provided by the present invention, water to be treated is purified by allowing *Lactobacillus paracasei* subspecies *paracasei*, *Enterococcus malodoratus* and *Candida lipolytica* to be concurrently present in the water. That is, the water purification is carried out by bringing/keeping the water purifier of the present invention into/to contact with water to be treated. The water to be treated includes a drain and sewage from general family homes, industrial effluents and waters of rivers, lakes, ponds, and the like.

For the purification of water, the water purifier of the present invention is preferably used in an amount of 1 to 50 g per liter of water to be treated, particularly preferably in an amount of 5 to 20 g per liter of water to be treated.

During the water purification, it is preferred to carry out airing.

The method of water purification, provided by the present invention, does not require any other particular conditions.

EXAMPLE

The present invention will be explained with reference to Examples hereinafter.

First, a medium having the following composition was prepared.

| Medium | |
|---|---|
| Peptone | 5 g |
| Extract of meat | 5 g |
| NaCl | 2.5 g |
| Water | 500 ml |
| | (pH 7.0) |

The medium having the above composition was placed in a 1,000 ml container, and the same microorganisms as DDD-a, DDD-b and DDD-c deposited in the above Patent Microorganism Depository were inoculated and fully stirred. Then, the container was allowed to stand to culture them at 30° C. for 1 day. The amount ratio of DDD-a:DDD-b:DDD-c was approximately 40:40:20.

The resultant medium liquid was subjected to a centrifugal separator to separate the microorganisms, and the microorganisms were fully washed and allowed to adhere to a carrier to give a water purifier in the form of a powder. The carrier had been prepared by firing diatomaceous earth and pulverizing it. The amount of the microorganisms supported on the carrier was approximately 5,000,000,000 microorganisms/cm³.

10 Grams of the above water purifier in the form of a powder was inoculated to 20 liters of a measurement object to measure a biochemical oxygen demand (BOD), a chemical oxygen demand (COD), a suspended solid (SS) and a change of clarity with passage of time. Concerning testing methods, BOD was determined according to JIS K 0102-21 and JIS K 0102-32.3, COD was determined according to JIS K 0102-17, SS was determined according to Table 6 attached to Recommendation No. 59, and the clarity was determined according to a water supply testing method (general properties). The measurement object was prepared by sampling water in a pond in Yukifuna Park (Edogawa Ward, Tokyo) on Jul. 4, 1998. The sampled water was placed in two containers in an amount of 20 liters each, and 10 g of the above water purifier was placed on one container and the water was aired (Example), and the other container with the water in it was allowed to stand (Comparative Example). After 5 days, the above BOD, etc., were measured. In the measurements of these data, the measurement object and the comparative object were allowed stand for 2 hours and their supernatants were used as t liquids. Table 1 shows the results.

TABLE 1

| No. | Measurement items | Unit | CEx. | Example |
|---|---|---|---|---|
| 1 | Biochemical oxygen demand (BOD) | mg/l | 7.7 | 3.1 |
| 2 | Chemical oxygen demand (COD) | mg/l | 37 | 8.7 |
| 3 | Suspended solid (SS) | mg/l | 86 | 2.8 |
| 4 | Clarity | degree | 15 | at least 30 |

CEx. = Comparative Example

As is clear in Table 1, the water purifier of the sent invention effectively purifies water.

What is claimed is as follows:

1. A water purifier containing microorganisms *Lactobacillu paracasei* subspecies *paracasei*, *Enterococcus malodoratus*, and *Candida lipolytica*.

2. A purifier as claimed in claim 1 wherein the microorganisms are fixed onto a carrier suitable for immersion into water.

3. A purifier as claimed in claim 1 wherein the number percentage ratios of the three microorganisms are:

| | |
|---|---|
| *Lactobacillus paracasei* subspecies *paracasei*: | 20 to 60% |
| *Enterococcus malodoratus*: | 20 to 60% |
| *Candida lipolytica*: | 10 to 30%. |

4. A purifier as claimed in claim 2 wherein the number percentage ratios of the three microorganisms are:

| | |
|---|---|
| *Lactobacillus paracasei* subspecies *paracasei*: | 20 to 60% |
| *Enterococcus malodoratus*: | 20 to 60% |
| *Candida lipolytica*: | 10 to 30%. |

5. A purifier as claimed in claim 1 wherein no other microorganism is present in a significant number to affect water purification by the said three microorganisms.

6. A purifier as claimed in claim 2 wherein no other microorganism is present in a significant number to affect water purification by said three microorganisms.

7. A purifier as claimed in claim 3 wherein no other microorganism is present in a significant number to affect water purification by said three microorganisms.

8. A purifier as claimed in claim 4 wherein no other microorganism is present in a significant number to affect water purification by said three microorganisms.

9. A method of water purification, which comprises allowing microorganisms *Lactobacillus paracasei* subspecies *paracasei*, *Enterococcus malodoratus*, and *Candida lipolytica* to be concurrently present in water to purify the water.

10. A method of purifying water which comprises treating the water with an effective amount of a water purifier containing microorganisms *Lactobacilus paracasei* subspecies *paracasei*, *Enterococcus malodoratus*, and *Candida lipolytica*.

11. A method as claimed in claim 10 wherein the microorganisms are fixed onto a carrier suitable for immersion into water.

12. A method as claimed in claim 10 wherein the number percentage ratios of the three microorganisms are:

13. A method as claimed in claim 11 wherein the number percentage ratios of the three microorganisms are:

| | |
|---|---|
| *Lactobacillus paracasei* subspecies *paracasei*: | 20 to 60% |
| *Enterococcus malodoratus*: | 20 to 60% |
| *Candida lipolytica*: | 10 to 30%. |

14. A method as claimed in claim 10 wherein no other microorganism is present in a significant number to affect water purification by said three microorganisms.

15. A method as claimed in claim 11 wherein no other microorganism is present in a significant number to affect water purification by said three microorganisms.

16. A method as claimed in claim 12 wherein no other microorganism is present in a significant number to affect water purification by said three microorganisms.

17. A method as claimed in claim 13 wherein no other microorganism is present in a significant number to affect water purification by said three microorganisms.

* * * * *